United States Patent [19]
Rogers et al.

[11] 3,923,389
[45] Dec. 2, 1975

[54] METHOD AND APPARATUS FOR PROJECTING A SCENE

[75] Inventors: Howard G. Rogers, Weston; Kestutis Norvaisa, West Concord, both of Mass.

[73] Assignee: Polaroid Corporation, Cambridge, Mass.

[22] Filed: June 8, 1971

[21] Appl. No.: 150,899

Related U.S. Application Data

[63] Continuation of Ser. No. 763,490, Sept. 20, 1968, abandoned.

[52] U.S. Cl. .................................................. 353/38
[51] Int. Cl.² ...................................... G03B 21/14
[58] Field of Search .......................... 350/162, 168; 353/30–34, 38

[56] References Cited
UNITED STATES PATENTS

| | | | |
|---|---|---|---|
| 1,836,787 | 12/1931 | Berthon | 353/32 |
| 2,813,146 | 11/1957 | Glenn | 350/162 SF |
| 3,045,531 | 7/1962 | Prescott | 350/162 SF |
| 3,095,475 | 6/1963 | Brake | 350/162 |

*Primary Examiner*—Harry N. Haroian
*Attorney, Agent, or Firm*—Gerald L. Smith

[57] ABSTRACT

A method and apparatus for projecting scenes recorded upon additive color film. This film is typically configured having a filter screen portion overlaying an image carrying base. The filter screen may be formed as an array of parallel color stripes layed down in a repetitive sequence of colors such as red, green and blue. A diffraction grating of the transmission amplitude or phase variety is inserted in the optical path of a projector to cause zero and first order images of a recorded scene. The order images are mutually displaced so as to superimpose the film screen filter stripe images in a manner which substantially minimizes the visibility of the discrete color stripes at a display surface.

1 Claim, 10 Drawing Figures

METHOD AND APPARATUS FOR PROJECTING A SCENE

This is a continuation of application Ser. No. 736,490, filed Sept. 20, 1968, now abandoned.

The present invention relates to the projectional display of scenes recorded upon photographic film, and more particularly, to a diffraction grating arrangement for use in projecting scenes which have been recorded upon film as an array of selectively colored image components which combine additively to form a full color image of a scene when viewed at a distance.

BACKGROUND OF THE INVENTION:

Film structures designed for recording full color images of scenes in accordance with the additive color theory traditionally are configured such that the recorded image is present as an array of adjacent and discrete components. Each of these image components is formed to represent a select color aspect of the photographed scene. When the entire scene image is viewed at a distance, the eye combines the components forming the image and, as a consequence, a substantially full color reproduction is witnessed.

The image components of the film structures are formed having a regular geometric shape. In the practice of this invention, any of a broad variety of these recurring image component film structures may be utilized. For illustrative purposes, the components are depicted taking the form of parallel stripes within the image area of a film frame. Each of the stripes or components functions to represent one chrominance aspect of a minute portion of an image. The color components are arranged in a manner providing a serially repetitive sequence of selected additive colors, such as the primaries red, blue and green.

Film structures utilizing the color additive system advantageously may be produced in any of a wide variety of configurations. For the most part, they take a laminar form basically including a filter layer sometimes referred to as a screen which incorporates the color stripes or other conventional pattern. This screen is deposited upon or formed with a photosensitive image carrying layer. By initially exposing the photosensitive layer through the color stripe carrying screen, a color coded composite image is derived. When light is projected through both the developed image layer and screen, the resultant scene or whole image will appear as a full color representation.

In addition to the desirable latitude enjoyed with the fabrication of a laminar film form, the additive film structure also permits the manufacture of a wide diversity of color film types. For instance, the laminar color additive film form enjoys particular advantage where the design of instant processing color film is contemplated. With its use, the broadly ranging instant processing techniques heretofore utilized with black and white transparencies are readily adapted to the task of developing full color scenes. One such color film product is described in a U.S. Pat. to Edwin H. Land, Ser. No. 2,614,926, entitled "Photographic Product Comprising an Additive Color Screen, a Silver Halide Layer and a Rupturable Container and a Process of Additive Color Photography," issued Oct. 21, 1952. That publication describes a multilayer film format including a color screen having receiving and photosensitive, silver halide layers superposed thereover. The photosensitive layer is exposable by actinic light transmitted through the screen layer. After exposure, a reversed and now color coded image of the latent image within the photosensitive layer is obtained in the receiving layer. Individual, rupturable pods of developer are arranged within the laminar film structure to effect the process of development. After the formation of the reversed image in the receiving layer the photosensitive layer is removed from the layer or layers containing the reversed image and the filter media of the screen, the latter layer or layers providing a positive transparency in color of the subject matter to which the photosensitive layer was exposed.

When displayed at conventional projection distances, additive color film transparencies will provide accurate color scene reproductions. As these scenes are displayed at relatively high magnification, however, the color stripes of the screen may become separately identifiable to an observer. Additionally, the magnified image derived from the projection of a film format utilizing a screen having parallel color stripes may also be observed to have a discernable pattern of fine dark lines. The thin lines forming this pattern usually represent a minute overlap of the edges of contiguous color stripes of the film structure. In most instances, the lines are the product of high volume manufacturing practices.

Both the dark line and the color stripe patterns may be diminished by causing a minor blend or meld of the projected images of contiguous stripes. For instance, a shift creating a selected overlap of screen stripe images at a display surface will cause a substantial disappearance of the patterns while maintaining an acceptably clear and desirable image projection. To provide for such a minute adjustment of projected images, however, somewhat precise instrumentation has been required. Where introduction to a high volume consumer market is contemplated, such instrumentation should be easily fabricable so as to be available to the consuming public at relatively low unit costs.

The instrumentation additionally should be capable of accommodating for design variations in the color contents of the stripes or color components within the film screen. To achieve a more desirable color balance within a recorded scene, the filter components within a screen are often dimensioned so as to emphasize the contribution of one or more of the primary colors. For instance, such a balance may be effected by varying widths of the stripes carrying the primary colors.

SUMMARY OF THE INVENTION:

The present invention provides a projection method and apparatus for displaying scenes recorded upon color film according to the color-additive process. The projection arrangement advantageously diminishes any identifiable color stripe or dark line pattern which may otherwise be encountered when projecting such scene images at higher magnification. In diminishing the projected patterns, the inventive arrangement causes a simultaneous projection of a plurality of images from each filmed scene. These projected images are not entirely in alignment or registry, but are displaced with respect to each other by a very small but predeterminable distance. This mutual displacement of the multiple images is established in a manner creating an overlay of the images of color stripes otherwise positioned substantially adjacent to one another within a film screen or filter.

The multiple images provided with the invention are created by a diffraction grating inserted within the optical path of a conventional projection system. Positioned within the optical path in the vicinity of the projector lens, the diffraction grating functions to impose a Fraunhofer form of diffraction upon the color film image transmitted through it. As a result, a plurality of scene images displaced along a singular projection axis are produced, each representing an order of diffraction. These overlapping images provide a color-additive blend or meld of the otherwise identifiable color components within the recorded scene.

By virtue of the overlapping of adjacent color component images formed as parallel stripes, the diffraction arrangement advantageously causes a projection over and consequent lightening of the opaque lines otherwise forming a geometric pattern at a display surface. As a result, this pattern is caused to substantially disappear.

The diffraction technique of the invention effects a desirable blend of discrete color components which have been formed within a film screen structure in regularly spaced, serially repetitive fashion. Inasmuch as the relative displacement of the projected images is of only a minute amount, the resultant composite image formed at a display surface appears adequately focused to an observer. The displacement of the first order images from their zero order image is uniaxial in nature. As a result, the blurring caused thereby is uniaxial and of negligible magnitude.

The invention is further characterized in utilizing a diffraction grating to cause the production of at least first order images of a recorded scene which are displaced from a zero order images of the scene by a predetermined distance. The magnitude of this displacement may be selected in accordance with the configuration of the grating.

Another feature and object of the invention is to provide a diffraction grating of the transmission variety for use in the projection of color-additive film, the grating being formed of regularly spaced parallel transmission portions dimensioned to define a grating frequency for causing the production of first order scene images displaced from a zero order scene image by an amount sufficient to cause an overlapping and additive blend of the images of the discrete color components of the film.

A further object of the invention is to provide a correcting diffraction grating arrangement of the type described which will function effectively when used with either motion picture or stationary film projection devices.

An additional object of the invention is to provide a transmission amplitude diffraction arrangement including a grating formed as a periodic array of alternately opaque and transparent portions dimensioned so as to maintain a balance of the color aspects present within a recorded image during projection by superpositioning their diffracted primary images. The relative spacing of the first order images derived through the diffraction grating technique of the invention is readily determinable through empirical or theoretical considerations of the image component dimensioning of the color film and the transmission frequency of the grating.

Another object of the invention is to provide an image blending system for projecting color-additive film of the type described which includes a fully transmissive phase grating designed so as to provide a plurality of projected scene images mutually displaced by a predetermined distance for causing an image blending effect at an image plane.

A further object of the invention is to provide a fully transmissive phase grating for use in supplementing the projection of images derived from color-additive film, wherein the grating is configured to adjust the relative intensities of first order diffraction images with respect to their zero order images so as to assure a properly blended full color projection image at a display surface.

BRIEF DESCRIPTION OF THE DRAWINGS:

For a fuller understanding of the nature and objects of the invention, reference should be had to the following detailed description taken in connection with the accompanying drawings wherein.

DETAILED DESCRIPTION OF THE DRAWINGS:

The blending arrangement of the invention functions to cause a simultaneous projection of a plurality of images from a scene recorded within a film frame as an array of image components. These images are displaced by very minor and predetermined distances in a manner forming an overlapped composite image at an image plane or display surface. The multiplication and displacement of the projected images are derived by a diffraction grating interposed within the optical path of the lens system of a projector. Generally, a diffraction grating may be defined as an arrangement which imposes on an incident wave a periodic variation of amplitude or phase or both. When such a device is inserted within the optical path of a projector near its lens system, a form of Fraunhofer diffraction arises to create a plurality of whole, mutually displaced images of the original scene. These images may be categorized as representing a zero order, primary order, secondary order, and so on, in accordance with conventional diffraction grating theory. The diffracted images of major interest for the present application are the zero and primary orders. Diffraction orders beyond the above are found to exert a negligible effect upon the projection image witnessed. The relative spacing between the zero and primary order images and the relative intensities of images representing the contribution of the primary color components of the filter screen of the film are derived in accordance with both the particular structure of the screen and its designed color balance. Two embodiments for a projection system utilizing diffraction gratings are discussed in the description to follow. Each embodiment employs a somewhat basic diffraction grating device. In the first embodiment the grating is formed as an array of periodically recurring opaque and transparent stripes. In a second embodiment, the diffraction grating is of a pulsed phase variety, having regularly spaced and periodically recurring transparent bands or lines of enhanced optical thickness and consequent higher diffractive effect. With either grating, a desirable blend of color components from the recorded scene is witnessed at the image plane of a projector system.

Figure 1:
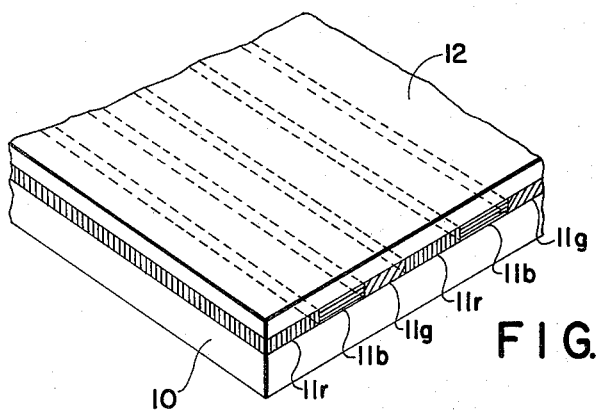
FIG. 1 is a perspective view of a fragment of color-additive film in exaggerated scale.

For illustrative purposes, the present image blending arrangement is described in conjunction with a typical color-additive film format. Referring to FIG. 1, such a film structure is shown to comprise a transparent base 10 upon which is deposited a screen or filter. The screen is depicted at 11 as a sequence of parallel stripes each representing a preselected primary color. These colors are identified by the subscripts r, b and g to indicate, respectively, the primaries red, blue and green. The laminar structure also includes a photosensitive image carrying layer 12 which is exposed through the filter layer 11. Layer 12 generally comprises a photosensitive emulsion similar to any of those utilized with conventional black and white films. It will be apparent that the positions of any of the layers within the laminar structure may be varied to suit any of a variety of photographic requirements. Additionally, the number of primary colors used within the film screen layer 11 may be reduced to two or increased to more than three.

Figure 2:
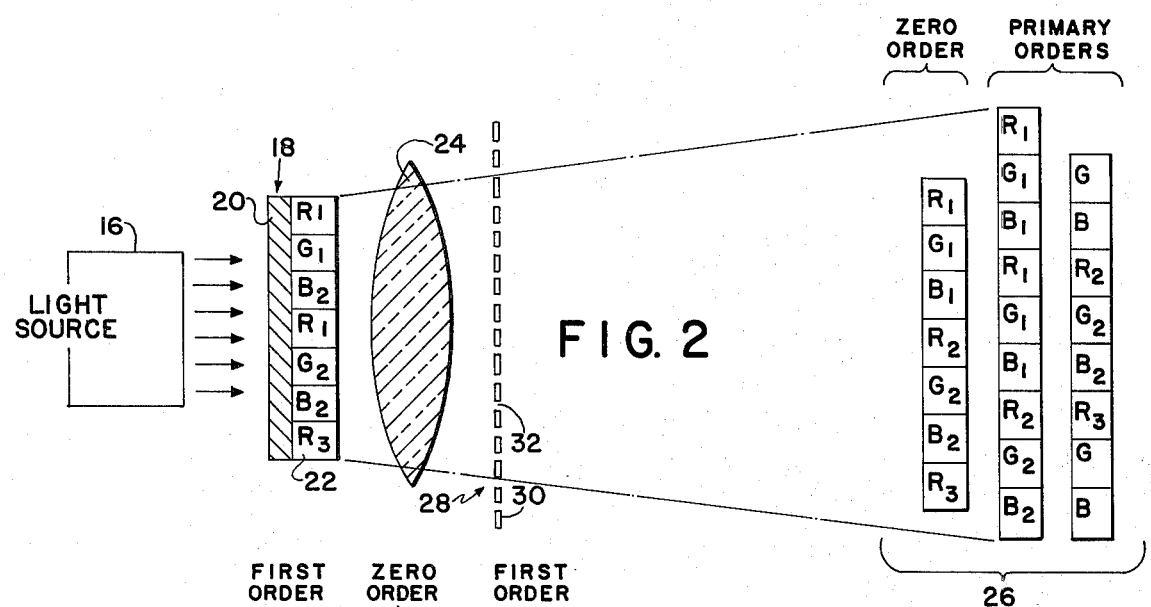
FIG. 2 is a schematic and sectional portrayal of a projection system according to the invention, showing an idealized representation of a projected scene in expanded form.

Referring to FIG. 2, an embodiment of the invention incorporating a transmission amplitude grating formed of alternately transparent and opaque bands is depicted. This diffraction grating is inserted within a projector optical path. At the commencement of this path, a light source 16, usually including such conventional elements as a projection lamp, light reflectors and condensers, provides basic illumination for the system. A fragment of color-additive film is illustrated in greatly exaggerated scale at 18 in position to intercept light emanating from the light source. As described in connection with FIG. 1, film 18 includes an image carrying layer and supportive base 20 over which is attached a screen 22. Screen 22 is formed of color stripes in the repetitive grouping of primaries red, blue and green. These stripes are identified, respectively, by the letters $R_1$, $G_1$, and $B_1$ in a first grouping and by $R_2$, $G_2$ and $B_2$ in the next adjacent grouping. The whole image of a scene recorded within a film frame incorporating the film fragment is projected through a projection lens 24 toward a display surface or image plane shown in expanded fashion at 26. Lens 24 is illustrated in simplified form and is intended to represent a projector lens system contributing the conventional functions of light gathering and focusing at display surface 26.

The diffraction grating for the embodiment is shown interposed within the projector optical path at 28. Grating 28 is formed of a sequence of equally dimensioned opaque bands or stripes 30 which are regularly spaced to form open or light transparent slits 32. The grating is aligned within the optical path such that the diffracting edges of rectangular transparent slits 32 lie in parallel relationship with the longitudinal orientation of the stripes within film screen 22. The tolerance of this parallel orientation need not be exacting. For instance, adequate results may be obtained at misalignments amounting to 15 degrees. Such manipulation may be used advantageously as a turning form of adjustment of the image blend. Grating 28 has a frequency ($f$) representing the number of transparent slits 32 per unit length of the grating extending across the optical path of the system.

Thus positioned within the projector optical path in the vicinity of image generation, a Fraunhofer form of diffraction will be in evidence at the image plane 26. This diffraction will form a zero order image at the center of the image plane as is depicted by the magnified image stripes $R_1$, $G_1$ . . . . . . $G_3$ aligned under the zero order column of the expanded image plane 26. Grating 28 also will produce a plurality of diffraction images the first orders of which can be visibly identified. The first orders of screen fragment image $R_1 - B_1 - G_1$ are depicted in the expanded image plane 26 by identically numbered stripe images. These first order images are displaced from their corresponding zero order images by amounts sufficient to form a desirable meld of the projected color components or stripes of the film structure. Generally, it is preferred that the system function to cause a superpositioning of the images of adjacent color stripes. For example, within a resultant composite image, a given projected red component will be overlayed substantially by adjacent blue and green stripes. This superposition will create a color-additive blend or meld. The amount of displacement of each first order image from the zero order image is selected by designing the diffraction grating in correspondence with the dimensions of the color components within the film screen. This image displacement for a first order has been derived as the product $f \lambda Z$ where $f$ is the frequency of the grating, $\lambda$ is the wavelength of a select light frequency and Z is the distance from the diffraction grating to the image plane.

An examination of the first order orientation at image plane 26 of the present embodiment will reveal that a displacement amounting to more than one stripe width is effected. This formation is purposely provided with opaque line amplitude gratings for causing an overlap of the first order images of identically colored stripes of adjacent repetitive color stripe groupings. The purpose for this orientation stems from the relative light intensities derived at the first order images as discussed in connection with the FIGS. 3a to 3c.

Figure 3A:
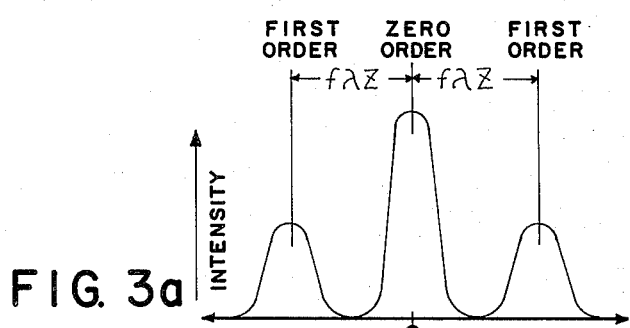
FIGS. 3a, 3b, and 3c depict waveforms representing the intensity contours and relative image displacements present respectively in red, green and blue light wavelength regions.
Figure 3B:
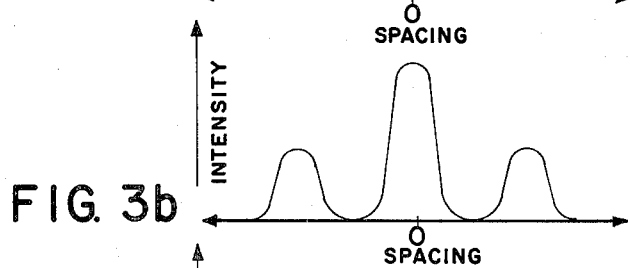
Figure 3C:
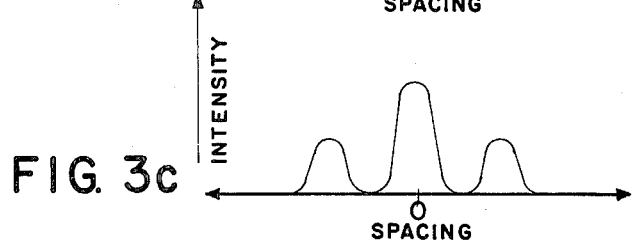

Referring to FIG. 3a, typical contours of intensities for the zero and first image orders of wave-lengths in the region as derived from an opaque line grating are illustrated. Similarily, intensity contours derived in green and blue light regions are shown, resepectively, in FIGS. 3b and 3c. These light regions correspond with the colors of the components or stripes of the film screen.

Where opaque line diffraction gratings are utilized for creating an image component overlap, it has been observed that the intensities of the first order images may be too low when compared with the amplitudes of their adjacent zero order. This relative amplitude distribution is in evidence in the above described FIGS. 3a through 3c. Without further adjustment, a simple overlay of the images of adjacent screen stripes may alter color balance at the image plane. An adjustment of spacing between zero and first order diffracted images as illustrated at 26 in FIG. 2 will reinsert an appropriate color balance. Note that the first order stripe images at 26 are spaced so as to cause a superposition of similarly colored first order image components, i.e. the first orders have been additively spaced. The resultant image has been found to be not only desirably blended, but also to be of proper color balance.

The first order image displacement necessary for accomplishing the above spacing may be provided by adjusting the grating frequency ($f$). A slight intensification of unidirectional blurring may be caused by the above described adjsutment, however, it is of dismissable magnitude. Where the film screens used with the system are configured providing stripe widths in one color such as red which are wider and therefore more predominant than those of another color, the above first image spacing technique again may be employed to effect an appropriate color balance of the projected image. The following example demonstrates the performance of an opaque line diffraction grating within a typical projection system.

EXAMPLE I

Color film of 8 millimeter size, having the image of a scene recorded thereon in full color according to the color-additive theory was inserted within a projector of a variety available in the amateur photographic market. The film was structured having a screen containing serially repeating red, green and blue stripes which extended across each film frame. The stripes were dimensioned so as to provide a screen frequency of 550 stripes per inch, however, the widths of the red stripes were slightly greater than the widths of the blue and green stripes. The image of the recorded scene was projected to focus upon a display surface positioned 64 inches from the objective lens of the projector. Vertically oriented images of the stripes of the film screen were visible in the full color magnified image perceived at the display surface. Additionally, some vertical oriented dark lines were visible. A diffraction grating having a frequency of 45 lines per inch and formed as a regular array of opaque lines upon a transparent film base was positioned in the optical path of the projected scene image. The lines of the grating were oriented in parallel with the stripes of the film format. The color stripe pattern previously observed at the display surface was observed to blend or meld to form a more pleasing image of the scene. The first order images of each primary color were found to be superposed. The dark line pattern was observed to substantially disappear from view. A desirable image blend at the display surface was maintained as the diffraction grating orientation was altered by about 15 degrees from vertical.

A similarly desirable image blend was demonstrated using a film format having a screen frequency of 756 stripes per inch and a diffraction grating having opaque lines of a 40 lines per inch frequency.

The alternately opaque and transmissive diffraction grating provides a resultant blended image having an intensity of slightly less than 50 per cent of that of an undiffracted image. Such transmission will be found adequate for most photographic purposes. However, substantially full transmsission is realized with the use of phase diffraction gratings.

Figure 4:
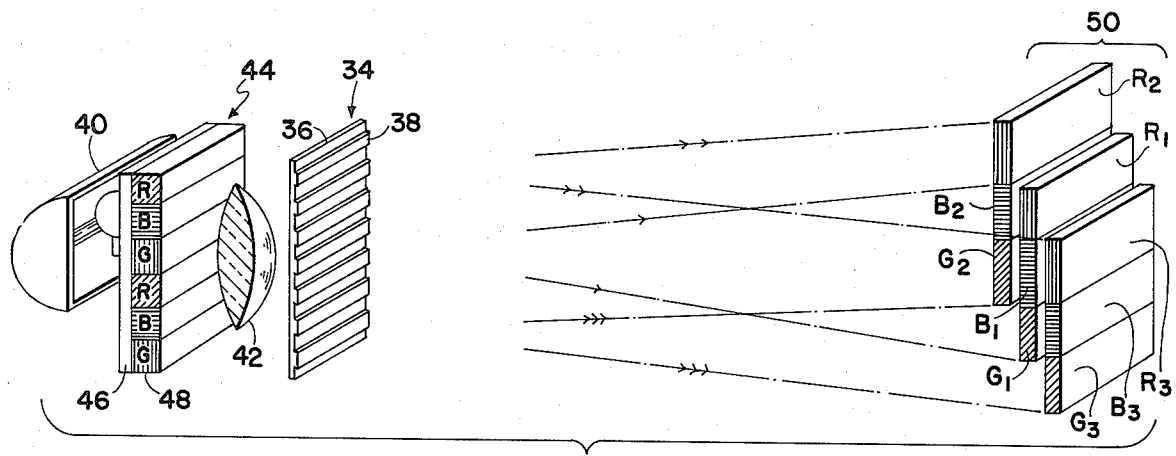
FIG. 4 is a schematic and partially sectional portrayal of a projection system according to the invention showing an idealized projection of a scene through a transmission phase grating in accordance with an embodiment of the invention.

Referring to FIG. 4, a second and more preferred embodiment of the invention incorporating a transmission phase grating formed as an optical surface having a regularly dimensioned series of recurring optically thicker diffraction portions disposed across it is illustrated. The phase grating is pictured in exaggerated scale at 34 and includes a plano base portion 36 upon which transparent bands 38 having substantially rectangular cross sections are positioned. As in the first embodiment, grating 34 is positioned in the optical path of a projection system which includes a light source 40 and projection lens 42. A fragment of color-additive film is illustrated in greatly exaggerated scale at 44 in position to intercept light emanating from the light source. Film 44 is structured having image carrying layer and supportive base 46 over which is formed a screen 48. Screen 48 is fashioned of parallel color stripes in the recurring sequence of primaries red, blue and green. These stripes are identified respectively, by the letters R, B and G. As in the earlier embodiments, a phase grating 34 having a select frequency ($f$) representing the number and spacing of bands 38 per unit length will generate a Fraunhofer form of diffraction at an image plane shown in expanded fashion at 50. This diffraction will form a zero order image at the center of the image plane 50 as depicted by the three magnified image stripes $R_1$, $B_1$ and $G_1$. Single arrow lead lines schematically represent the projection of such a zero order image. Grating 34 will also produce a plurality of diffraction images, the first orders of which can be visibly identified. The first orders of screen fragment image $R_1$–$G_1$–$B_1$ are depicted in the expanded image plane 50 by stripes $R_2$–$G_2$–$B_2$ within the double arrow lead lines and on the opposite side of the zero order image as stripes $R_3$–$G_3$–$G_3$ within the triple arrow lead lines. The first order images are displaced from the zero order images by amounts sufficient to form a desirable meld of the projected color components or stripes of the film structure. Grating 34 may be designed so as to cause a first order spacing adequate for causing the additive overlay of adjacent color stripes. As in the case of the earlier embodiment, the amount of displacement of each first order image form the zero order image is selected by designing the diffraction grating in correspondence with the color component dimensions within the film screen. Similar to the amplitude grating described earlier, this displacement of the primary orders may be derived from the product $f\lambda Z$.

Figure 5A:
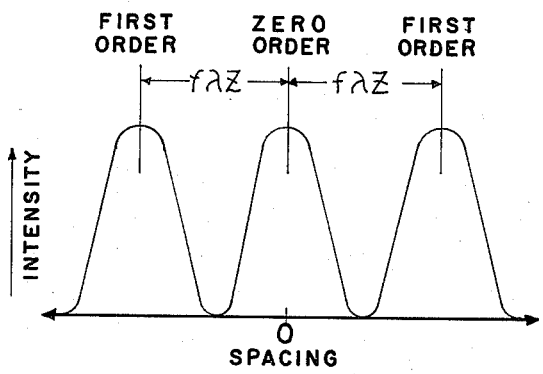
FIGS. 5a, 5b and 5c are wave-shape diagrams showing intensity contours respectively in red, green and blue regions for images projected and diffracted through a fully transmissive phase grating according to an embodiment of the invention.
Figure 5B:
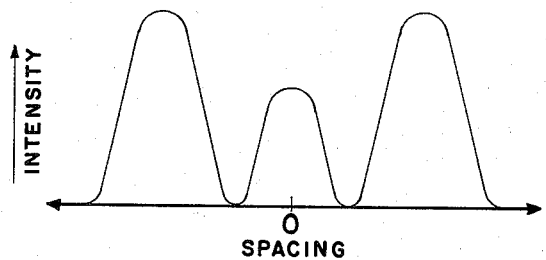

Referring to FIG. 5a, typical contours of light intensities for the zero and first image orders of wavelengths in the red region as derived from a phase grating are illustrated. By adjusting the thicknesses of bands 38 upon the grating 34, the relative amplitudes of the first orders of the red region wavelengths may be equalized with the amplitude of the zero order. In FIG. 5b, the relative intensity of each of the first orders for wavelengths in the green region are shown to have been increased to a value above that of the zero order. Similarly, in FIG. 5c, it may be observed that the relative amplitudes of the blue region first orders are higher than the amplitude of the zero order.

Figure 5C:
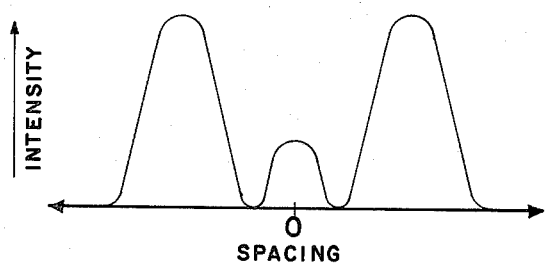

The relative intensity distribution occasioned with the use of a phase diffraction grating as evidenced in FIGS. 5a through 5c is of particular advantage. For instance, the earlier described low relative intensities of the first orders is altered such that their additive overlay is not necessitated. Inasmuch as the first orders of the nondominant color components may be reproduced having the relatively high amplitudes evidenced in FIGS. 5a through 5c, an adequate contribution of the subsidiary colors may be retained without providing wide, first order image adding spacings. The unidirectional image blurring, therefore, is minimized. The following example demonstrates the performance of a phase grating as above described when inserted within a typical projection system.

EXAMPLE II

Color film of 8 millimeter size, having the image of a scene recorded thereon in full color according to the color-additive theory was inserted within a projector of the variety sold in the amateur photographic market. The film was structured having a screen containing serially repeating red, green and blue stripes which extended across each film frame. The stripes were dimensioned so as to provide a screen frequency of 550 stripes per inch, however, the width of the red stripes within the screen were slightly greater than the widths of the blue and green stripes. The image of the recorded scene was projected to focus upon a display surface positioned 64 inches from the objective lens of the projector. Vertically oriented images of the stripes of the film screen were discernable in the full color magnified image perceived at the display surface. Additionally, some vertical dark lines were visible at the display surface. A phase grating having a frequency of 25 bands per inch and formed by vacuum vapor depositing a regular array of magnesium fluoride bands of 1.26 micron thickness upon the planar surface of a thin glass plate was positioned in the optical path of the projected scene image. The bands of the grating were oriented in parallel with the stripes of the film format. The color stripe pattern previously observed at the display surface was observed to blend or meld to form a more pleasing image of the scene. The dark line pattern was observed to substantially disappear from view. The desirable image blend at the display surface was maintained as the diffraction grating orientation was altered by about 15° from vertical. The quality of light transmission through the projector system appeared to be unaffected.

A similarly desirable image blend was demonstrated using a film screen format having a screen frequency of 756 stripes per inch and a phase grating having bands of 1.26 micron thicknesses arranged to provide a 20 band per inch frequency.

From the foregoing examples and description it may be observed that a projection of higher and more desirable total light transmission is available with phase gratings as opposed to opaque line amplitude transmission gratings. Either variety of grating may be adjusted to conform with the color balance design of a color screen. A considerable latitude is provided in mounting the gratings over a projector lens system, inasmuch as a precise alignment of the grating and film screen stripes is not required. As indicated earlier, this latitude may be used to provide a trim or tuning function for the diffracting system. By tilting a grating along the projection axis of the system, a form of frequency adjustment is derived for controlling the image blend at a display surface.

To evolve an appropriate Fraunhofer form of diffraction, the gratings should be interposed within the projector optical path somewhere in the vicinity of the projection lens. Considerable latitude is available for this mounting. For instance, the grating structure may be deposited or appropriately formed upon a surface of the lens system of a projector. Alternately, the gratings may be installed within a simple bracket for facile insertion over the lens mounting structure of a projector.

Figure 6:
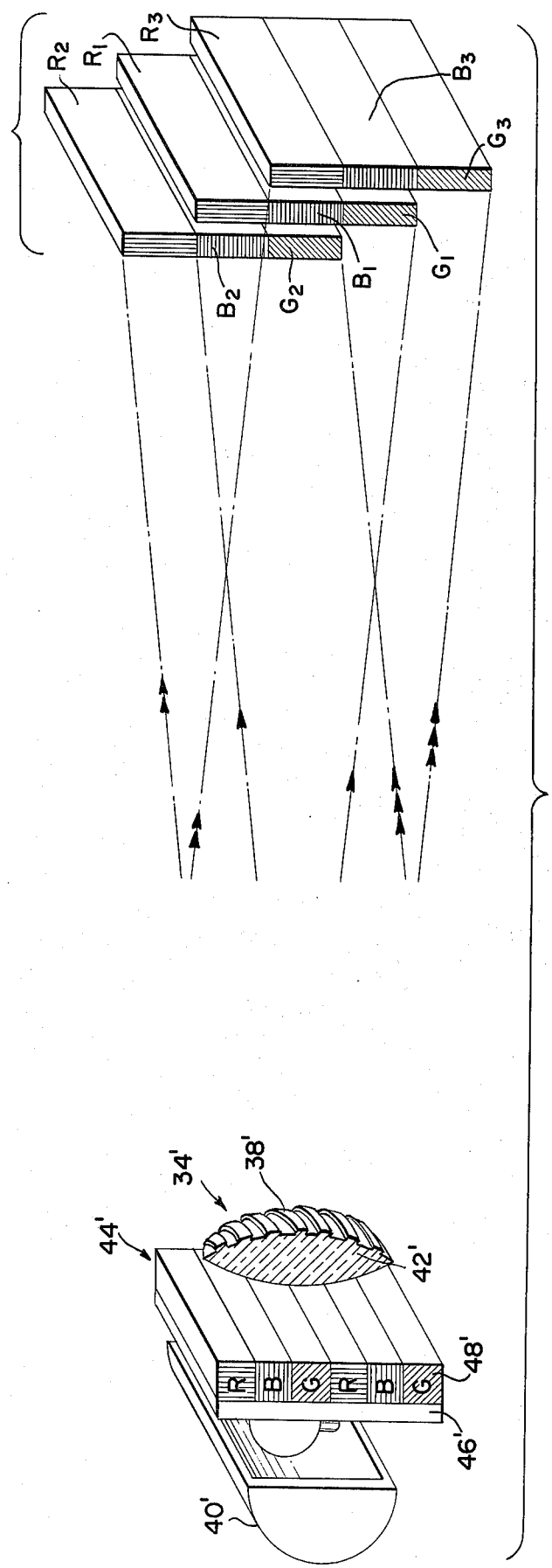
FIG. 6 is a schematic and partially sectional portrayal of a projection system according to the invention showing an idealized projection of a scene through a transmission phase grating in accordance with another embodiment of the invention.

Referring to FIG. 6, an embodiment of the invention wherein a transmission phase grating is formed upon a surface of a projection lens is illustrated. The phase grating is pictured in exaggerated scale at 34' and includes a regularly dimensioned series of recurring optically thicker defraction portions 38' formed upon one surface of projection lens 42'. As in the earlier embodiments, a light source 40' is incorporated with lens 42'. A fragment of color-additive film is illustrated in greatly exaggerated scale at 44' in position to intercept light emanating from the light source 40'. Film 44' is structured having image carrying layer and supportive base 46' over which is formed a screen 48'. Screen 48' is fashioned of parallel color stripes in the recurring sequence of primaries red, blue and green. These stripes are identified, respectively, by the letters R, B and G. The grating arrangement at 34' will generate zero and ordered images at an image plane shown in expanded fashion at 50'. Note that the defraction forms a zero order image at the center of the image plane 50' as depicted by three magnified image stripes $R_1$, $B_1$ and $G_1$. Single arrow lead lines schematically represent the projection of such a zero order image. Grating 34' will also produce a plurality of defraction images, the first orders of which can be visibly identified. The first orders of screen fragment image $R_1 - G_1 - B_1$ are depicted in the expanded image plane 50' by stripes $R_2 - G_2 - B_2$ within the double arrow lead lines and on the opposite side of the zero order image as stripes $R_3 - G_3 - B_3$ within the triple arrow lead lines. The first order images are displaced from the zero order images by amounts sufficient to form a desirable meld of the projected color components or stripes of the film structure. Grating 34' may be designed so as to cause a first order spacing adequate for causing the additive overlay of adjacent color stripes. As in case of the earlier embodiments, the amount of displacement of each first order image from the zero order image is selected by designing the defraction grating in correspondence with the color component dimensions within the film screen. This displacement of the primary orders may be derived from the product $f\lambda Z$.

Further evidencing the desirably broad latitude of their use, a diffraction grating of a given frequency will be found acceptable for use over a relatively wide range of projection distances. Also, the simplicity of their structure permits incorporation within a broad variety of projection devices.

Since certain changes may be made in the above discussed image blending arrangement without departing from the scope of the invention herein involved, it is intended that all matter contained in the above description or shown in the accompanying drawings shall be interpreted as illustrative and not in a limiting sense.

We claim:

1. Apparatus for projecting a scene recorded upon an image carrier as an array of regularly spaced color components arranged in a serially repetitive fashion comprising:

means including a projection lens system for projecting said recorded scene through an optical path and providing a magnified image thereof at an image plane; and a diffraction grating formed upon an optical surface of said lens system for diffracting the image projected therethrough to derive at least zero and first order images from said components mutually spaced at said image plane such that any color component projected as a zero order image has superimposed upon it at least one separate color component projected as a first order image, whereby geometric patterns otherwise encountered during the projection of said array of the color components are caused to blend additively.

* * * * *